United States Patent [19]

Clegg

[11] Patent Number: 4,577,620

[45] Date of Patent: Mar. 25, 1986

[54] HEMISPHERIC SOLAR PANEL

[76] Inventor: John E. Clegg, 2320 Keystone Dr., Orlando, Fla. 32806

[21] Appl. No.: 705,153

[22] Filed: Feb. 25, 1985

[51] Int. Cl.⁴ ............................................... F24J 2/24
[52] U.S. Cl. .................................... 126/440; 136/417; 136/450
[58] Field of Search ................ 126/440, 442, 450, 417

[56] References Cited

U.S. PATENT DOCUMENTS

| 895,761 | 8/1908 | Huntoon | 126/440 X |
| 1,093,498 | 4/1914 | Thring | 126/440 |
| 3,934,573 | 1/1976 | Dandini | 126/440 |
| 4,299,201 | 11/1981 | Tsubota | 126/440 |
| 4,422,434 | 12/1983 | Statz et al. | 126/440 X |

FOREIGN PATENT DOCUMENTS

| 18998 | of 1913 | United Kingdom | 126/440 |
| 375685 | 6/1932 | United Kingdom | 126/440 |

Primary Examiner—Larry Jones

[57] ABSTRACT

A multiple array of hemispheric lenses which focus solar rays onto heat-absorbing metal spheres embedded inside the lenses, and a conduit formed by the hemispheric lenses, a glass plate mounted above the lenses and two opposed parallel vertical side walls. Heat absorbed by the metal spheres is conducted upward through the lenses to water circulating through the conduit to the point of use.

1 Claim, 2 Drawing Figures

HEMISPHERIC SOLAR PANEL

BACKGROUND

Prior art can be separated into four groups according to the type of lenses used to collect solar radiation, as follows;

1. Spherical Lenses. This group includes Great Britain Pat. No. 18,998 of Keun, Great Britain Pat. No. 375,685 of Ylla-Conte, and U.S. Pat. No. 3,934,573 of Dandini. Clegg's hemispheric solar panel will belong to this group.

2. Elongate, Rectilinear Convex Lenses. This group includes U.S. Pat. No. 4,267,826 of Hitt, Great Britain Pat. No. 2,100,415 of Subryan and Japan Pat. No. 21749 of Akane.

3. Conical Lenses. This group includes U.S. Pat. No. 4,325,612 of Clegg and U.S. Pat. No. 4,333,713 of Clegg.

4. Miscellaneous Lenses. This group includes U.S. Pat. No. 2,259,902 (toroidal lens) of McCain, U.S. Pat. No. 4,411,490 (fresnel lenses) of Daniel, and French Pat. No. 2,446,450 (prismatic lenses) of Bel Hamri.

Considering the spherical lens art of the first group, Keun uses a large biconvex lens to project concentrated beams onto boiler tubes. Ylla-Conte uses a large sectional convexplanar lens or a large stepped lens to track the sun. Dandini uses multiple small convex lenses mounted on a large transparent sphere to project concentrated beams inward to a central spherical receiving element through which liquid sodium is pumped.

SUMMARY

Clegg uses multiple hemispheric lenses to focus concentrated beams onto small metal spheres embedded inside the lenses. Heat absorbed by the metal spheres is conducted upward through the lenses to water circulating through a conduit above the lenses.

All hemispheric lenses of Clegg's panel are operational without tracking and without reflectors.

The four elements which Clegg claims are original and unique are the hemispheric lenses to concentrate the rays of the sun, the metal spheres to absorb the heat of the concentrated beams, the hemispheric lenses to conduct heat from the metal spheres to the conduit, and the use of an exposed circulating medium flowing over the lenses through the conduit to the point of use.

DRAWINGS

DESCRIPTION

Figure 1:
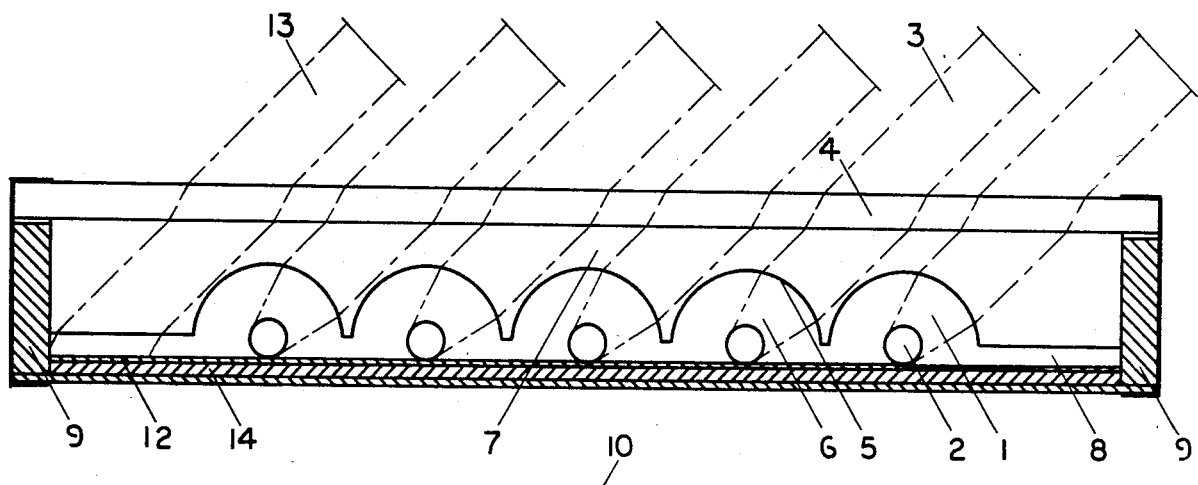
FIG. 1 is a cross sectional view of the hemispheric solar panel.

FIG. 1 is a cross sectional view of the hemispheric solar panel comprising five hemispheric lenses 1 with five solid heat-absorbing metal spheres 2 embedded therein. Incident beams 3 of direct sunlight pass through glass plate 4 and are refracted by spherical faces 5, forming convergent beams 6 which strike metal spheres 2. The heat absorbed by metal spheres 2 is conducted upward through lenses 1 and released into water circulating through conduit 7.

Figure 2:
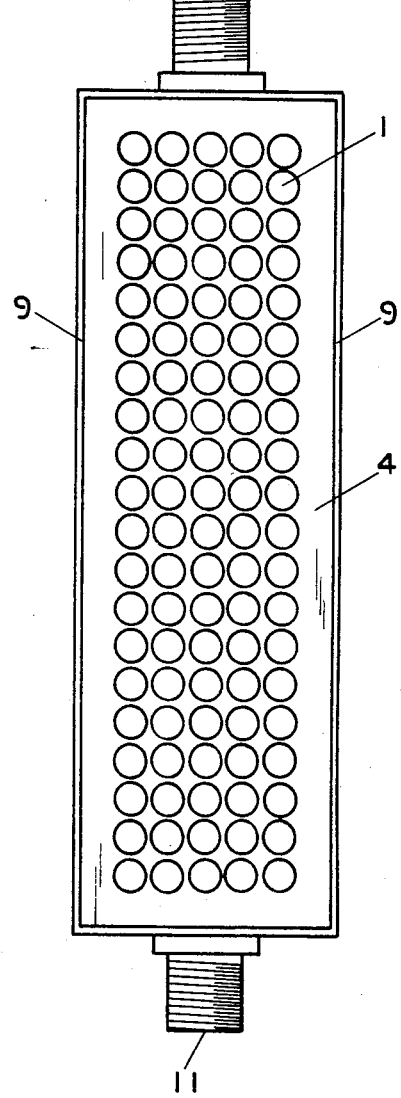
FIG. 2 is a plan view of the hemispheric solar panel.

Conduit 7 is defined by hemispheric lenses 1, planar glass base plate 8, glass plate 4 and two opposed parallel vertical side walls 9 and two opposed parallel vertical end walls. Water enters fluid conduit 7 through inlet pipe 10 and exits fluid conduit 7 through outlet pipe 11, as shown in FIG. 2.

Metal base plate 12 absorbs heat from solar rays 13 which do not strike hemispheric lenses 1, and the heat thus absorbed is conducted to fluid conduit 7 through glass base plate 8. a sheet 14 of thermal insulation prevents loss of heat from metal plate 12 through the base of the panel.

I claim:

1. A hemispheric solar panel comprising;
   an array of multiple hemispheric lenses (1) having concentric outer and inner spherical faces and arranged in parallel rows and integrally mounted on a planar glass base plate (8) occupying a horizontal plane below said hemispheric lenses (1),
   multiple solid heat-absorbing metal spheres (2) embedded in the center of said hemispheric lenses (1),
   a metal base plate (12) mounted below said glass base plate (8),
   a sheet (14) of thermal insulation mounted below said metal base plate (12),
   a top glass plate (4) mounted above said hemispheric lenses (1) and spatially separated therefrom,
   two opposed parallel vertical side walls (9),
   two opposed parallel vertical end walls,
   a fluid conduit (7) having a top formed by said top glass plate (4), having a base formed by said hemispheric lenses (1) and by said glass base plate (8), having sides formed by said two opposed parallel vertical side walls (9), and having ends formed by said two opposed parallel vertical end walls,
   an inlet pipe (10) opening into said fluid conduit (7) through one said parallel end wall, and
   an outlet pipe (11) opening into said fluid conduit (7) through the opposite said parallel end wall;
   said hemispheric lenses (1) serving as mounting means of said metal spheres (2), serving as means of focusing solar beams (6) onto said metal spheres (2), serving as means of absorbing heat from said metal spheres (2) and conducting the heat to a fluid flowing through said fluid conduit (7), and serving as a basal portion of said fluid conduit (7),
   said glass base plate (8) serving as mounting means of said hemispheric lenses (1) and serving as a basal portion of said fluid conduit (7),
   said metal spheres (2) serving as elements which absorb the heat of said solar beams (6) and which release the heat to said hemispheric lenses (1) and to said metal base plate (12),
   said metal base plate (12) serving as an element which absorbs the heat of solar beams (13) and of said metal spheres (2) and which releases the heat to said glass base plate (8),
   said top glass plate (4) serving as a window which transmits solar beams (3) to said hemispheric lenses (1) and to said glass base plate (8),
   said fluid conduit (7) serving as a channel through which a heat-transfer fluid flows.

* * * * *